United States Patent
Shen et al.

(10) Patent No.: US 7,380,633 B2
(45) Date of Patent: Jun. 3, 2008

(54) VEHICLE SENSING METHOD FOR DETECTING A PEDESTRIAN IMPACT

(75) Inventors: Junqiang Shen, Kokomo, IN (US); Lawrence C Hau, Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 332 days.

(21) Appl. No.: 11/149,815

(22) Filed: Jun. 9, 2005

(65) Prior Publication Data

US 2006/0278461 A1 Dec. 14, 2006

(51) Int. Cl.
*B60K 28/10* (2006.01)

(52) U.S. Cl. .................. 180/274; 280/735; 701/45; 340/435

(58) Field of Classification Search .............. 280/735; 180/274; 340/435, 436, 903; 701/45
See application file for complete search history.

(56) References Cited

U.S. PATENT DOCUMENTS

| | | | |
|---|---|---|---|
| 7,036,621 B2* | 5/2006 | Takafuji et al. ............ | 180/274 |
| 7,148,792 B2* | 12/2006 | Takafuji et al. ............ | 340/436 |
| 2002/0033294 A1* | 3/2002 | Ishizaki et al. ............ | 180/274 |
| 2002/0180596 A1 | 12/2002 | Mattes et al. | |
| 2004/0108157 A1* | 6/2004 | Takafuji et al. ............ | 180/274 |
| 2004/0182629 A1* | 9/2004 | Takahashi et al. .......... | 180/274 |
| 2004/0186643 A1* | 9/2004 | Tanaka et al. .............. | 701/45 |
| 2004/0210367 A1* | 10/2004 | Takafuji et al. ............ | 701/45 |
| 2005/0161273 A1* | 7/2005 | Makita et al. .............. | 180/274 |
| 2005/0269805 A1* | 12/2005 | Kalliske et al. ........... | 280/730.1 |
| 2006/0213714 A1* | 9/2006 | Igawa ...................... | 180/274 |
| 2006/0219461 A1* | 10/2006 | Kiribayashi ............... | 180/274 |
| 2007/0100526 A1* | 5/2007 | Heimerl et al .............. | 701/45 |
| 2007/0125589 A1* | 6/2007 | Murphy .................... | 180/274 |

FOREIGN PATENT DOCUMENTS

WO 2004/076240 9/2004

OTHER PUBLICATIONS

European Search Report dated Oct. 6, 2006.

* cited by examiner

*Primary Examiner*—Toan To
(74) *Attorney, Agent, or Firm*—Douglas D. Fekete

(57) ABSTRACT

The collision of a vehicle with a pedestrian is detected by the presence of a foreign object in a sensing zone above the hood of the vehicle within a prescribed time of an initial impact with the bumper of the vehicle. The initial impact is detected with an acceleration sensor disposed in or near the front bumper and the sensing zone is defined by object detection sensors disposed on the hood or behind the windshield of the vehicle. Vehicle speed is used to discriminate against events that occur while the vehicle is stationary or moving very slowly.

10 Claims, 3 Drawing Sheets

VEHICLE SENSING METHOD FOR DETECTING A PEDESTRIAN IMPACT

TECHNICAL FIELD

The present invention relates to pedestrian impact detection for a vehicle, and more particularly to a sensing method that provides timely and reliable detection of pedestrian impacts for which pedestrian safety devices should be deployed.

BACKGROUND OF THE INVENTION

A vehicle can be equipped with deployable safety devices designed to reduce injury to a pedestrian struck by the vehicle. For example, the vehicle may be equipped with one or more pedestrian air bags and/or a device for changing the inclination angle of the hood. Since these devices are only to be deployed in the event of a pedestrian impact, the deployment system must be capable of reliably distinguishing pedestrian impacts from abuse events (such as hammer blows to the front bumper) and impacts with other objects. In this regard, it has been recognized that pedestrian impacts are nearly always characterized by two impacts: a first impact with the vehicle bumper followed by a second impact with the vehicle hood. Thus, the vehicle can be equipped with one or more bumper impact sensors and one or more hood impact sensors, as suggested in the U.S. Patent Publication No. 2002/0180596 A1, for example. However, equipping a production vehicle with the required sensors can be both costly and difficult. Moreover, it can be difficult to deploy the safety devices in time to effectively reduce pedestrian injury since the collision is only detected after the pedestrian strikes the hood. Accordingly, what is needed is a pedestrian impact detection method that is more practical and cost-effective and that provides earlier detection of the impact without sacrificing detection reliability.

SUMMARY OF THE INVENTION

The present invention provides an improved pedestrian impact sensing method that detects an initial impact followed by the presence of a foreign object in a detection zone above the hood of the vehicle. A set of object detection sensors laterally distributed across the width of the vehicle define the detection zone, and a pedestrian impact is deemed to have occurred when the presence of an object in the detection zone is detected within a predefined time interval following the initial impact. In a preferred embodiment, the initial impact is detected with an acceleration sensor disposed in or near the front bumper and the detection zone is defined by proximity sensors disposed on the hood or behind the windshield of the vehicle. Also, vehicle speed is used to discriminate against events that occur while the vehicle is stationary or moving very slowly.

DESCRIPTION OF THE PREFERRED EMBODIMENT

Figure 1A:
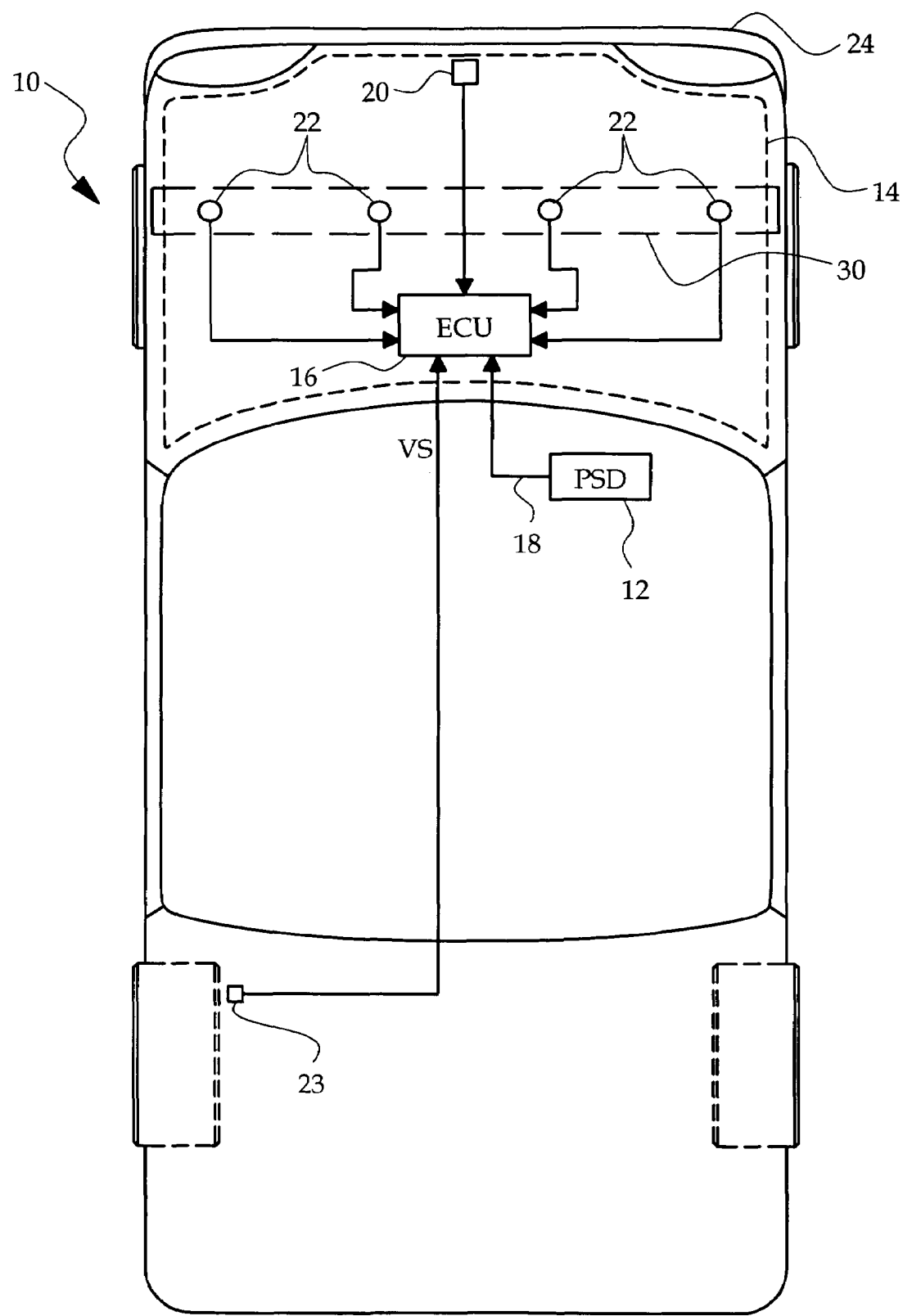
FIG. 1A is a diagram of a vehicle equipped with pedestrian safety devices, acceleration and object detection sensors, and a microprocessor-based electronic control unit (ECU) programmed to carry out the sensing method of the present invention.

Referring to FIG. 1A, the reference numeral 10 designates a vehicle that is equipped with one or more pedestrian safety devices and a sensing system for deploying the safety devices when a pedestrian impact is detected. The pedestrian safety devices (PSDs) are designated by a single block 12, and may include one or more pedestrian air bags and a mechanism for changing the inclination angle of the vehicle hood 14. The PSDs are selectively activated by a microprocessor-based electronic control unit (ECU) 16, which issues a deployment command on line 18 when a pedestrian impact is detected. The ECU 16 detects pedestrian impacts based on inputs from a number of sensors, including an accelerometer 20 and a set of object detection sensors 22. Additionally, the ECU 16 is responsive to the vehicle speed VS, which may be determined from one or more wheel speed sensors 23.

The acceleration sensor 20 is mounted in the front of the vehicle 10, preferably on a rear surface of the front bumper 24. The sensor 20 is designed to exhibit high sensitivity (such as 50 mV/g) and low dynamic range (such as ±50 g) in order to be responsive to forces of a frequency and a magnitude that typically occur when the bumper 24 collides with a pedestrian.

Figure 1B:
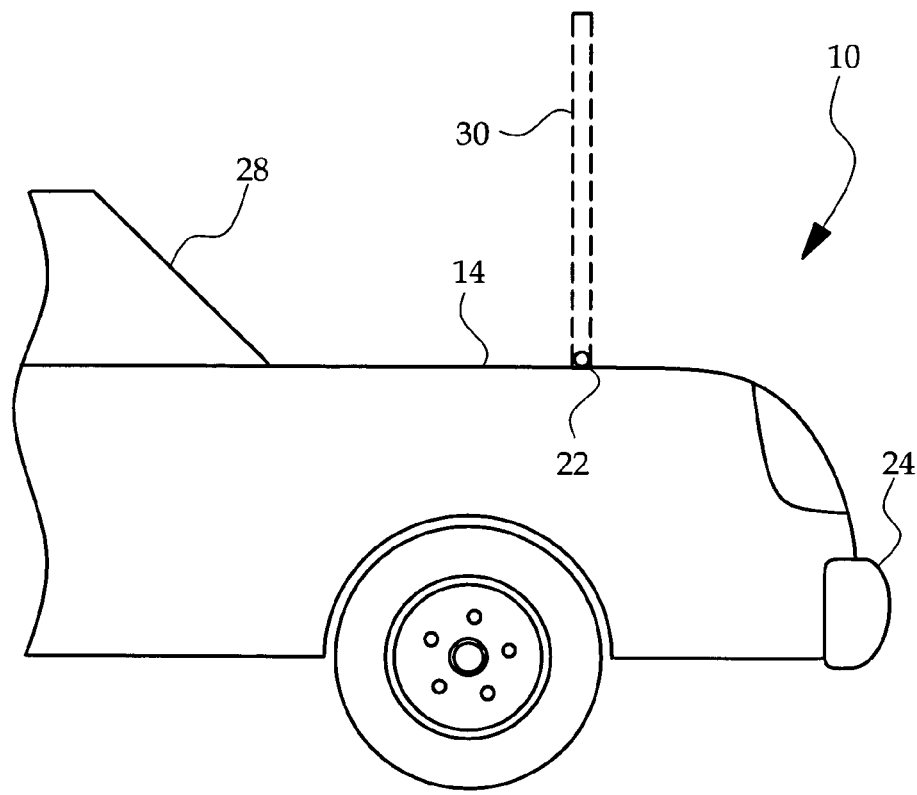
FIG. 1B is a side view of the vehicle of FIG. 1A depicting a detection zone defined by the object detection sensors of FIG. 1A.
Figure 2:
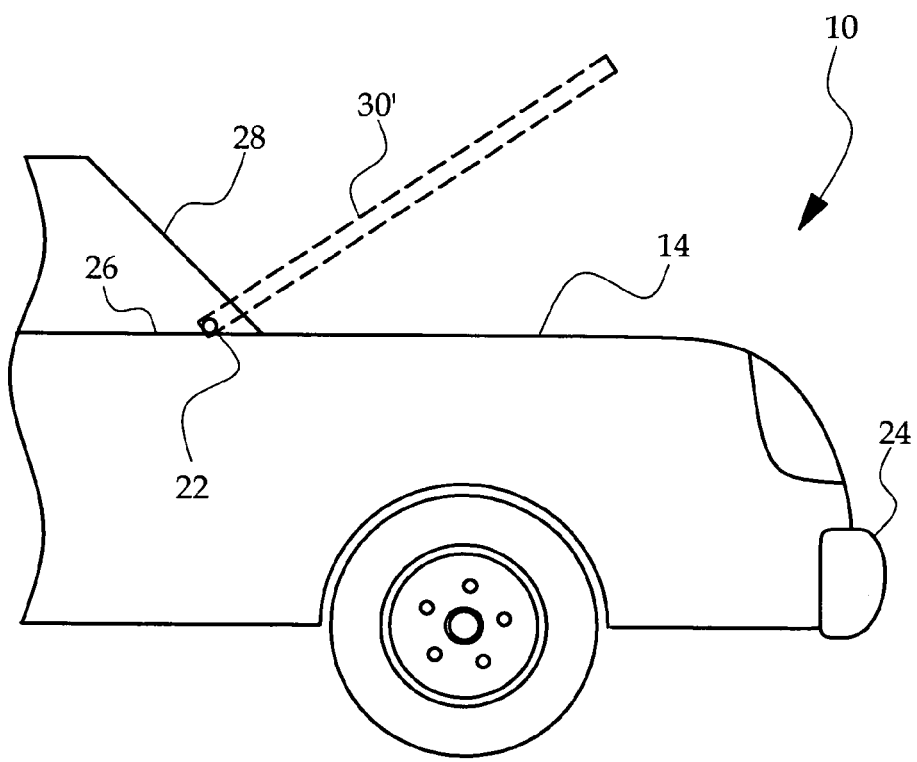
FIG. 2 depicts a detection zone defined by the object detection sensors of FIG. 1A when they are located behind the vehicle windshield.

The object detection sensors 22 may be infrared proximity sensors, or ultrasonic, laser or radar sensors, for example, and can be mounted on the hood 14 as illustrated in FIG. 1A or behind the vehicle windshield 28 as illustrated in FIG. 2. In either mounting location, the proximity sensors 22 are laterally distributed across the width of the vehicle to define a sensing plane or detection zone for detecting the presence of an object such as a pedestrian directly above the hood 14 (or fender panels adjacent the hood 14). When the object detection sensors 22 are mounted on the hood 12 as illustrated in FIGS. 1A-1B, they are aimed primarily upward to define a substantially vertical sensing plane 30. When the object detection sensors 22 are mounted behind the windshield 28 (either on a cowl 26 under the windshield 28 or on the inner surface of the windshield 28 itself) as illustrated in FIG. 2, they are aimed forward and upward to define an inclined sensing plane 30'. In either implementation, the object detection sensors 22 are designed to have a detection range of about 2.5 m so that they are insensitive to objects beyond the area immediately above the hood 14. Although a set of four object detection sensors 22 are depicted in the illustrated embodiments, the number of sensors needed in any particular application will vary depending on the vehicle dimensions and sensor capabilities.

In general, the acceleration signal developed by acceleration sensor 20 is used to detect a potential impact with a pedestrian, and a pedestrian impact is confirmed if the object detection sensors 22 detect the presence of an object in the sensing plane 30/30' within a predefined time interval of the impact detected by the acceleration signal. The vehicle speed signal VS is used to discriminate against events that occur while the vehicle 10 is stationary or moving very slowly.

Figure 3:
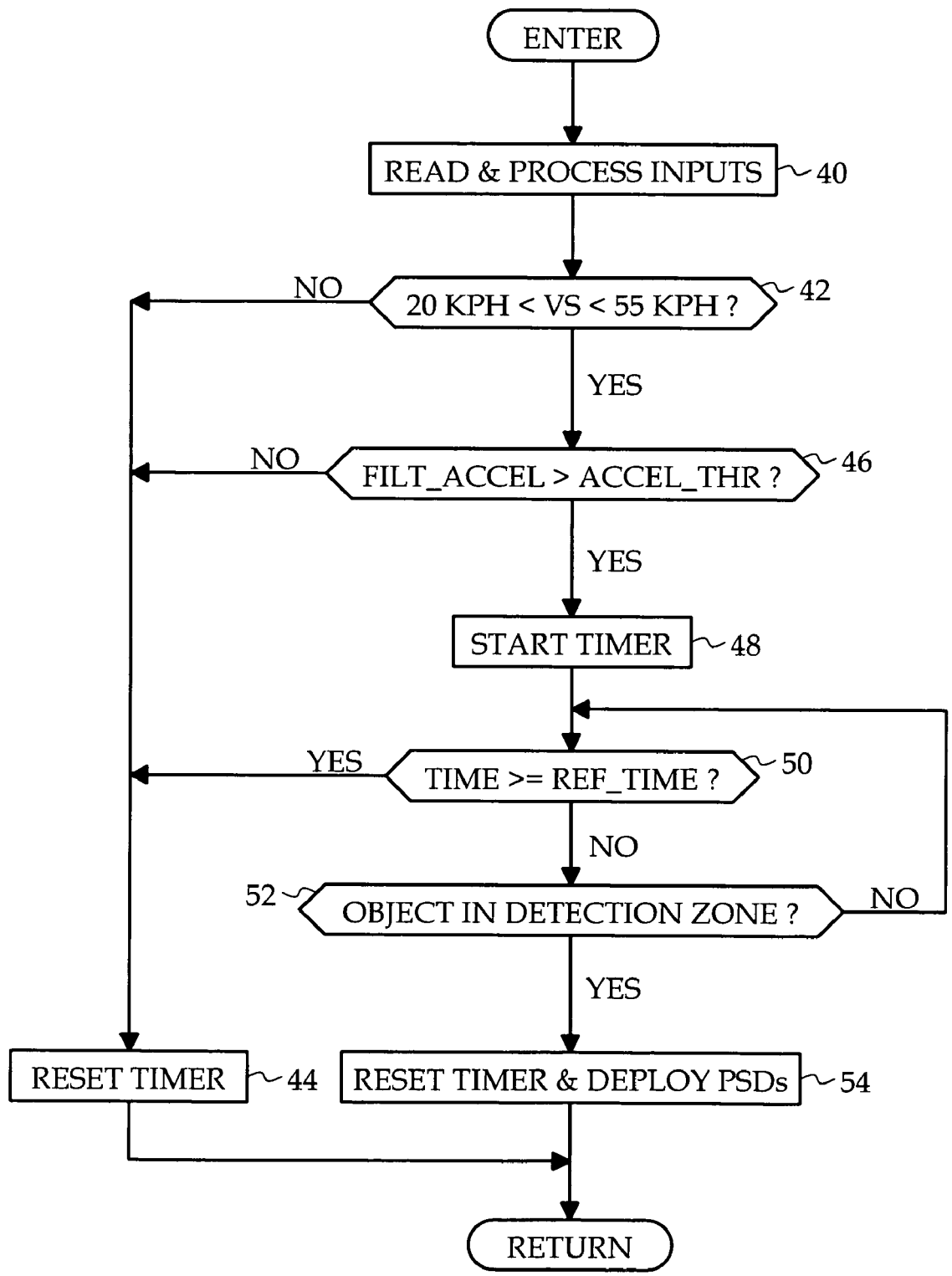
FIG. 3 is a flow diagram representative of a software routine executed by the ECU of FIG. 1A for carrying out the method of the present invention.

Referring to FIG. 3, the illustrated flow diagram represents a software routine periodically executed by ECU 16 for carrying out the above-described pedestrian impact detection method. Initially, the ECU 16 reads and processes the various input signals as indicated by block 40. For example, the acceleration signal produced by sensor 20 may be low-pass filtered with a cut-off frequency of approximately 500 Hz to form a filtered acceleration term FILT_ACCEL, and the wheel speed input(s) may be averaged to form a vehicle speed term VS. If VS is outside a predefined speed window such as 20 KPH-55 KPH, the blocks 42 and 44 reset a timer and exit the routine. If VS is within the predefined speed window, the block 46 compares FILT_ACCEL to a calibrated acceleration threshold ACCEL_THR (typically in the range of 5 g-20 g) to detect a potential impact with a pedestrian. If such an impact is not detected, the block 44 is executed to reset the timer and exit the routine. Once a potential pedestrian impact has been detected, the block 48 starts the timer, and the blocks 50 and 52 are repeatedly executed until the timer reaches a prescribed reference time REF_TIME such as 10 ms-25 ms. Block 50 compares the timer to REF_TIME and block 52 determines if the object detection sensors 22 have detected an object in the sensing plane 30/30'. If the timer reaches REF_TIME before the object detection sensors 22 detect an object, the block 44 is executed to reset the timer and exit the routine. If the object detection sensors 22 detect an object before the timer reaches REF_TIME, the block 54 is executed to reset the timer and issue a command for deploying the passenger safety devices.

In summary, the present invention provides a practical and cost-effective method of detecting pedestrian impacts. The detection is timely because it does not require contact between the pedestrian and the vehicle hood, and the use of two different sensing technologies (acceleration and proximity, for example) within a prescribed time interval enhances the detection reliability. While the invention has been described with respect to the illustrated embodiments, it is recognized that numerous modifications and variations in addition to those mentioned herein will occur to those skilled in the art. For example, the method may be applied to the rear of the vehicle instead of or in addition to the front of the vehicle, and so on. Accordingly, it is intended that the invention not be limited to the disclosed embodiment, but that it have the full scope permitted by the language of the following claims.

The invention claimed is:

1. A method of detecting an impact of a vehicle with a pedestrian, comprising the steps of:
    detecting an initial impact between a bumper of the vehicle and an object that is potentially a pedestrian;
    sensing for presence of the object in a detection zone above a hood of the vehicle; and
    confirming that said object is a pedestrian when the presence of the object is sensed in the detection zone within a prescribed time after the detected initial impact.

2. The method of claim 1, including the steps of:
    measuring an acceleration of said bumper;
    low-pass filtering the measured acceleration; and
    detecting said initial impact when the filtered acceleration exceeds a prescribed acceleration threshold.

3. The method of claim 1, where the step of sensing for presence of the object in the detection zone above the hood of the vehicle includes the step of:
    providing one or more object detection sensors on said hood, said object detection sensors being aimed upward to define a substantially vertical detection zone.

4. The method of claim 3, including the step of:
    providing a set of object detection sensors laterally distributed across said hood so that said detection zone is substantially as wide as said vehicle.

5. The method of claim 1, where the step of sensing for presence of the object in the detection zone above the hood of the vehicle includes the step of:
    providing one or more object detection sensors on or behind a windshield of said vehicle, said object detection sensors being aimed forward and upward to define an inclined detection zone.

6. The method of claim 5, including the step of:
    providing a set of laterally distributed object detection sensors so that said inclined detection zone is substantially as wide as said vehicle.

7. The method of claim 1, including the step of:
    commanding deployment of a pedestrian safety device when the impact of the vehicle with a pedestrian is confirmed.

8. The method of claim 1, including the step of:
    inhibiting the detection of an impact of the vehicle with a pedestrian when a speed of the vehicle is less than a prescribed speed.

9. The method of claim 1, including the step of:
    inhibiting the detection of an impact of the vehicle with a pedestrian when a speed of the vehicle is greater than a prescribed speed.

10. The method of claim 1, including the steps of:
    starting a timer when said initial impact is detected; and
    confirming that said object is a pedestrian if the presence of said object in the detection zone is sensed before said timer reaches said prescribed time.

* * * * *